United States Patent
Kobori

(10) Patent No.: US 10,450,465 B2
(45) Date of Patent: Oct. 22, 2019

(54) RESIN FILM AND METHOD FOR MANUFACTURING RESIN FILM

(71) Applicant: SAMSUNG SDI CO., LTD., Yongin-si Gyeonggi-do (KR)

(72) Inventor: Shigeto Kobori, Yokohamashi (JP)

(73) Assignee: Samsung SDI Co., Ltd., Yongin-si (KR)

( * ) Notice: Subject to any disclaimer, the term of this patent is extended or adjusted under 35 U.S.C. 154(b) by 325 days.

(21) Appl. No.: 15/101,405

(22) PCT Filed: Dec. 5, 2014

(86) PCT No.: PCT/KR2014/011911
§ 371 (c)(1),
(2) Date: Jun. 2, 2016

(87) PCT Pub. No.: WO2015/084097
PCT Pub. Date: Jun. 11, 2015

(65) Prior Publication Data
US 2016/0304722 A1  Oct. 20, 2016

(30) Foreign Application Priority Data

Dec. 5, 2013 (JP) .................................. 2013-251682
Nov. 25, 2014 (KR) ........................ 10-2014-0165598

(51) Int. Cl.
*C09D 4/00* (2006.01)
*G02B 1/111* (2015.01)
(Continued)

(52) U.S. Cl.
CPC ............. *C09D 4/00* (2013.01); *B05D 3/0209* (2013.01); *B32B 19/02* (2013.01); *B32B 19/045* (2013.01);
(Continued)

(58) Field of Classification Search
CPC ... G02B 1/18; C09D 4/00; C09D 7/67; C09D 7/70; Y10T 428/25; B32B 19/00; B32B 19/02; B32B 19/045
See application file for complete search history.

(56) References Cited

U.S. PATENT DOCUMENTS 5,081,165 A    1/1992  Inukai et al.
6,160,067 A    12/2000 Eriyama et al.
(Continued)

FOREIGN PATENT DOCUMENTS

EP    0 877 777 B1    1/2000
JP    09-100111       4/1997
(Continued)

OTHER PUBLICATIONS

Translation of KR20120093212. (Year: 2012).*
(Continued)

*Primary Examiner* — Catherine A. Simone
(74) *Attorney, Agent, or Firm* — Lewis Roca Rothgerber Christie LLP

(57) ABSTRACT

Disclosed herein is a resin film. The resin film has a height difference of about 10 nm to about 65 nm between a convex portion and a concave portion on an outermost surface thereof, and has a difference in contact angle ($\Delta CA$) of less than about 10°, as represented by Equation 1:

$$\Delta CA = |CA2 - CA1| \quad \text{[Equation 1]}$$

where in Equation 1, CA1 is a water droplet contact angle after a surface of a substrate coated with the resin film has been subjected to a 500-cycle reciprocating abrasion test using an eraser under a load of 500 g/cm$^2$, and CA2 is a water droplet contact angle before the reciprocating abrasion test. Embodiments of the invention provide a novel and improved resin film capable of improving antifouling and slip properties and enhancing film strength, and a method of manufacturing the same.

6 Claims, 1 Drawing Sheet

(51) Int. Cl.

| | |
|---|---|
| *G02B 1/18* | (2015.01) |
| *C09D 7/40* | (2018.01) |
| *C09D 4/06* | (2006.01) |
| *C09D 5/00* | (2006.01) |
| *G02B 1/118* | (2015.01) |
| *B32B 19/02* | (2006.01) |
| *B32B 19/04* | (2006.01) |
| *C08F 283/06* | (2006.01) |
| *C08F 292/00* | (2006.01) |
| *B05D 3/02* | (2006.01) |
| *C08K 7/26* | (2006.01) |
| *C08K 3/36* | (2006.01) |
| *B05D 3/04* | (2006.01) |
| *B05D 3/06* | (2006.01) |

(52) U.S. Cl.
CPC ........ *C08F 283/065* (2013.01); *C08F 292/00* (2013.01); *C09D 4/06* (2013.01); *C09D 5/006* (2013.01); *C09D 7/67* (2018.01); *C09D 7/70* (2018.01); *G02B 1/111* (2013.01); *G02B 1/118* (2013.01); *G02B 1/18* (2015.01); *B05D 3/0254* (2013.01); *B05D 3/0486* (2013.01); *B05D 3/067* (2013.01); *C08K 3/36* (2013.01); *C08K 7/26* (2013.01); *C08K 2201/003* (2013.01); *C08K 2201/011* (2013.01); *G02B 2207/107* (2013.01)

(56) References Cited

U.S. PATENT DOCUMENTS

| | | | |
|---|---|---|---|
| 6,716,513 B1 * | 4/2004 | Hasuo | ............... C03C 17/007 |
| | | | 428/141 |
| 2008/0138606 A1 * | 6/2008 | Yoshihara | ............... B32B 7/02 |
| | | | 428/327 |

FOREIGN PATENT DOCUMENTS

| | | |
|---|---|---|
| JP | 2004-109966 | 4/2004 |
| JP | 2006-336008 | 12/2006 |
| JP | 2010-085983 A | 4/2010 |
| KR | 10-2011-0013751 | 2/2011 |
| KR | 10-2012-0093212 A | 8/2012 |
| WO | WO 2012/165766 A2 | 12/2012 |
| WO | WO 2013/141442 A1 | 9/2013 |

OTHER PUBLICATIONS

Korean Office action from corresponding Korean Application No. 10-2014-0165598, Korean Office action dated Jun. 20, 2017 (7 pgs.).
International Search Report for corresponding PCT Application No. PCT/KR2014/011911, dated Mar. 4, 2015, with English Translation (5 pages).
Written Opinion for corresponding PCT Application No. PCT/KR2014/011911, dated Mar. 4, 2015 (8 pages).
SIPO Office Action for corresponding Chinese Application No. 201480066313.5, dated Nov. 1, 2016 (8 pages).

* cited by examiner

[Figure 1]
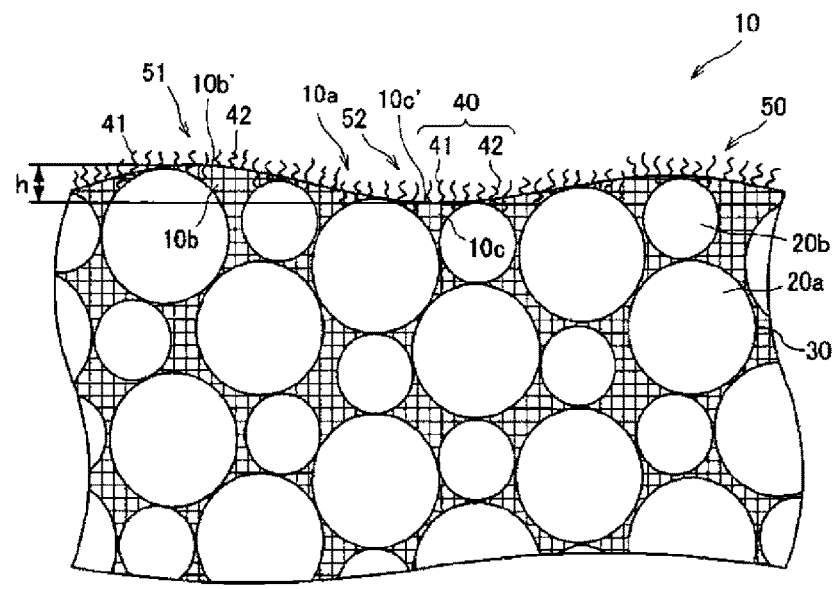
[Figure 2]
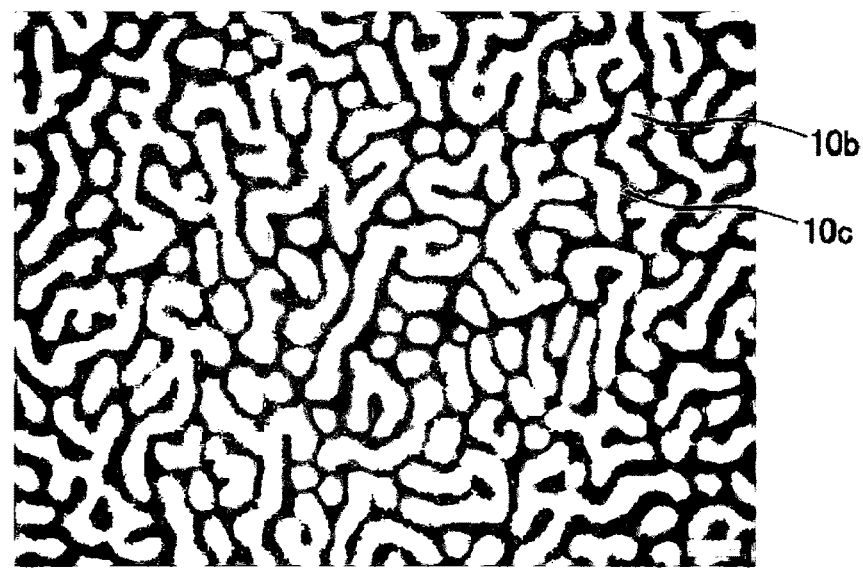

RESIN FILM AND METHOD FOR MANUFACTURING RESIN FILM

CROSS-REFERENCE TO RELATED APPLICATIONS

This Application is a National Phase Patent Application and claims priority to and the benefit of International Application Number PCT/KR2014/011911, filed on Dec. 5, 2014, which claims priority to and the benefit of each of Japanese Application No. 2013-251682, filed on Dec. 5, 2013, and Korean Application No. 10-2014-0165598, filed on Nov. 25, 2014, the entire contents of all of which are incorporated herein by reference.

BACKGROUND

1. Field

Aspects of embodiments of the present invention relate to a resin film and a method of manufacturing the resin film.

2. Description of the Related Art

As disclosed in JP2004-109966 A and JP2006-336008 A, for example, an anti-reflection film is often adhered to a surface of a liquid crystal display, a plasma display, and the like. The anti-reflection film serves to prevent light reflection at the surface of the display, thereby improving visibility of the display. A conventional anti-reflection film has a low refractive index layer having lower refractive index and a high refractive index layer having higher refractive index than that of the low refractive index layer.

The low refractive index layer includes hollow silica particles, an acrylic resin, a fluorinated acrylic resin, and additives. The hollow silica particles are silica particles of a hollow structure and serve to reduce an index of refraction of the low refractive index layer. The acrylic resin serves as a binder which binds the hollow silica particles to one another. The fluorinated acrylic resin serves to bind the hollow silica particles to one another, while reducing the index of refraction of the low refractive index layer.

The additives are coupled to hollow silica particles distributed on a surface of the low refractive index layer, thereby imparting antifouling properties and slip properties to the low refractive index layer, that is, to the anti-reflection film. Examples of such additives may include silicon polymers and fluoropolymers. The additives are present on the surface of the low refractive index layer in order to properly function.

However, in a conventional low refractive index layer, additives are distributed not only on the surface of the low refractive index layer, but also inside the low refractive index layer as well. For example, the reason why the additives are distributed inside the low refractive index layer is that hollow silica particles and fluorinated acrylic resin disrupt "bleed-out" (migration to the surface of the low refractive index layer) of the additives. In other words, the additives cannot effectively move to the surface due to the hollow silica particles acting as a barrier. In addition, the additives exhibit affinity with the fluorinated acrylic resin. For example, since both fluoropolymers and fluorinated acrylic resins include fluorine, they are likely to have high affinity with each other, which can cause the additives to stay in the vicinity of the fluorinated acrylic resins.

Accordingly, in the conventional low refractive index layer, the additives cannot be effectively localized at the surface of the low refractive index layer. As a result, although the conventional low refractive index layer initially exhibits good antifouling properties and slip properties, the low refractive index layer suffers from significant deterioration in these properties after repeated surface wiping.

Further, the conventional low refractive index layer has a problem in that the additives distributed inside the low refractive index layer reduce crosslinking density of binder resins (i.e. an acrylic resin and a fluorinated acrylic resin), thereby causing deterioration in film strength. Specifically, the additives (particularly, fluoropolymer) have repellency to the acrylic resin. Thus, the acrylic resin is unlikely to be distributed around the additives, thereby causing reduction in crosslinking density of the acrylic resin.

JP2004-109966 A discloses a technique in which a surface of a hard-coat layer is formed in a convex-concave shape, followed by forming a low refractive index layer on the surface of the hard-coat layer, thereby obtaining a convex-concave low refractive index layer. According to this technique, the low refractive index layer is expected to exhibit improved antifouling properties by virtue of the convex-concave shape thereof. However, this technique cannot provide localization of additives at the surface of the low refractive index layer. In addition, this technique has a problem in that the surface of the hard-coat layer needs to be formed in a convex-concave shape so as to obtain the convex-concave-shaped low refractive index layer, which requires intensive efforts.

JP2006-336008 A discloses an anti-reflection film having a sea-island structure composed of a phase not containing silica particles and a phase containing silica particles. However, this technique cannot provide localization of additives at the surface of the low refractive index layer. In addition, in this technique, the anti-reflection film also exhibits very poor durability. Thus, the techniques disclosed in these patent documents cannot solve the aforementioned problems.

SUMMARY

According to aspects of embodiments of the present invention, a novel and improved resin film has improved antifouling and slip properties and film strength, and a method of manufacturing the same is provided.

In accordance with an aspect of one or more embodiments of the present invention, a resin film has a height difference of about 10 nm to about 65 nm between a convex portion and a concave portion on an outermost surface thereof, and has a difference in contact angle ($\Delta CA$) of less than about 10°, as represented by Equation 1:

$$\Delta CA = |CA2 - CA1| \qquad [\text{Equation 1}]$$

where in Equation 1, CA1 is a water droplet contact angle after a surface of a substrate coated with the resin film has been subjected to a 500-cycle reciprocating abrasion test using an eraser under a load of 500 g/cm$^2$, and CA2 is a water droplet contact angle before the reciprocating abrasion test.

The resin film may include hollow silica particles having an average particle diameter of greater than about 20 nm and less than or equal to about 100 nm and solid core silica particles having an average particle diameter of about 20 nm or less.

The hollow silica particles may be present in an amount from greater than about 5 wt % to less than about 50 wt %, and the solid core silica particles may be present in an amount from greater than about 0 wt % to less than about 10 wt % in the resin film.

The resin film may include a photopolymerizable fluoropolymer and a thermopolymerizable fluoropolymer.

The resin film may include about 1.5 mass % or more to about 7 mass % or less of the total photopolymerizable fluoropolymer and the thermopolymerizable fluoropolymer.

The thermopolymerizable fluoropolymer and the photopolymerizable fluoropolymer may satisfy Equation 2:

$$P2/P1 < 0.43 \qquad \text{[Equation 2]}$$

where in Equation 2, P2 is an amount of the thermopolymerizable fluoropolymer and P1 is an amount of the photopolymerizable fluoropolymer.

In accordance with another aspect of one or more embodiments of the present invention, a composition for a resin film includes: hollow silica particles having an average particle diameter of greater than about 20 nm and less than or equal to about 100 nm; solid core silica particles having an average particle diameter of about 20 nm or less; additives including a photopolymerizable fluoropolymer and a thermopolymerizable fluoropolymer; and a binder monomer.

The composition may include: greater than about 5 wt % to less than about 50 wt % of the hollow silica particles; greater than about 0 wt % to less than about 10 wt % of the solid core silica particles; about 1.5 wt % or more to about 7 wt % or less of the photopolymerizable fluoropolymer and the thermopolymerizable fluoropolymer; and the binder monomer.

The binder monomer may contain a hydrogen bonding group capable of forming a hydrogen bond with other functional groups.

The hydrogen bonding group may include a hydroxyl group.

The binder monomer may have a surface tension of about 36 dyne/cm to about 45 dyne/cm.

In the composition, each of the hollow silica particles and the solid core silica particles may include a photopolymerizable functional group, and the photopolymerizable functional group may include at least one of an acryloyl group and a methacryloyl group.

In the composition, each of the hollow silica particles and the solid core silica particles may further include a thermopolymerizable functional group.

In the composition, the thermopolymerizable fluoropolymer may have a greater weight average molecular weight than the photopolymerizable fluoropolymer.

In the composition, the thermopolymerizable fluoropolymer may have a weight average molecular weight of about 10,000 or greater, and the photopolymerizable fluoropolymer may have a weight average molecular weight of less than about 10,000.

In accordance with another aspect of one or more embodiments of the present invention, a method of manufacturing a resin film includes: preparing a coating solution for a resin film, the coating solution including a binder monomer, hollow silica particles having an average particle diameter of greater than about 20 nm and less than or equal to about 100 nm, solid core silica particles having an average particle diameter of about 20 nm or less, a photopolymerizable fluoropolymer, and a thermopolymerizable fluoropolymer; applying the coating solution to a substrate to form a coating layer; forming a protective layer by the photopolymerizable fluoropolymer and the thermopolymerizable fluoropolymer bleeding to a surface of the coating layer; and initiating polymerization.

In the method, the hollow silica particles may be present in an amount from greater than about 5 mass % to less than about 50 mass %, and the solid core silica particles may be present in an amount from greater than about 0 mass % to less than about 10 mass %.

In the method, the total amount of the photopolymerizable fluoropolymer and the thermopolymerizable fluoropolymer may be from about 1.5 mass % or more to about 7 mass % or less.

In the method, the thermopolymerizable fluoropolymer and the photopolymerizable fluoropolymer may satisfy Equation 2:

$$P2/P1 < 0.43 \qquad \text{[Equation 2]}$$

where in Equation 2, P2 is an amount of the thermopolymerizable fluoropolymer and P1 is an amount of the photopolymerizable fluoropolymer.

In the method, each of the hollow silica particles and the solid core silica particles may include a photopolymerizable functional group, and the photopolymerizable functional group may include at least one of an acryloyl group and a methacryloyl group.

In the method, each of the hollow silica particles and the solid core silica particles may further include a thermopolymerizable functional group.

In the method, the binder monomer may contain a hydrogen bonding group, wherein the hydrogen bonding group may include a hydroxyl group.

In the method, the thermopolymerizable fluoropolymer may have a greater weight average molecular weight than the photopolymerizable fluoropolymer.

In the method, the thermopolymerizable fluoropolymer may have a weight average molecular weight of about 10,000 or greater, and the photopolymerizable fluoropolymer may have a weight average molecular weight of less than about 10,000.

According to aspects of embodiments of the present invention, the photopolymerizable fluoropolymer and the thermopolymerizable fluoropolymer can effectively bleed out to be localized due to repulsion by a binder resin, and a low refractive index layer is formed with a sea-island structure on a surface thereof. Therefore, according to the embodiments of the invention, the resin film can exhibit improved antifouling properties, slip properties, scratch resistance, and film strength. In addition, a height difference of the sea-island structure can be controlled by adjusting the amount ratio of the hollow silica particles to the solid core silica particles.

BRIEF DESCRIPTION OF THE DRAWINGS

FIG. 1 illustrates a schematic side sectional view of a resin film according to an embodiment of the present invention.

FIG. 2 illustrates a micrograph of a shape measuring laser microscope showing a surface of a resin film according to an embodiment of the present invention.

DETAILED DESCRIPTION

As used herein, the term "hollow silica particles" refers to silica particles having pores therein. Such hollow silica particles may refer to silica particles having a porosity of, for example, about 10% or more, about 15% or more, or about 20% or more.

Further, as used herein, the term "solid core silica particles" refers to silica particles that do not have artificial pores therein. For example, although the solid core silica particles can become more effective as the porosity approaches 0%, the solid core silica particles may have a porosity of about 5% or less, about 3% or less, about 1% or less, or about 0% to about 1%, according to a manufacturing process thereof.

In addition, the porosity, as used herein, may be measured using transmission electron microscopy (TEM). TEM allows clear imaging of contrast between a hollow portion and a solid portion. Thus, the hollow and solid portions are specified using an image captured using TEM, followed by calculating the volume of a particle and the volume of a hollow portion based on the specified results. Then, the porosity may be calculated by volumes, and by equation of Porosity=(volume of hollow portion/total volume of particle)×100.

Hereinafter, some embodiments of the present invention will be described in further detail with reference to the accompanying drawings. In the specification and the drawings, portions irrelevant to the description may be omitted for clarity. Like components will be denoted by like reference numerals throughout the specification.

<1. Composition of Resin Film>

A resin film according to an embodiment has a height difference of about 10 nm to about 65 nm between a convex portion and a concave portion on an outermost surface thereof, and has less than about 10° of a difference in contact angle (ΔCA) represented by Equation 1:

ΔCA=|CA2−CA1|   [Equation 1]

where in Equation 1, CA1 is a water droplet contact angle after a surface of a substrate coated with the resin film has been subjected to a 500-cycle reciprocating abrasion test using an eraser under a load of 500 g/cm², and CA2 is a water droplet contact angle before the reciprocating abrasion test.

The difference in contact angle (ΔCA) in an embodiment is 5.4° or less, and, in one embodiment, is 5° or less.

The contact angle before/after the reciprocating abrasion test may be measured using a fully automatic contact angle analyzer. For example, the contact angle may be measured using a fully automatic contact angle analyzer DM700 (Kyowa Interface Science Co., LTD.) after dropping 2 μl of pure water onto a substrate coated with the resin film.

A resin film 10 according to an embodiment will be described with reference to FIG. 1. The resin film 10 may include a low refractive index layer 10a and additives 40. Here, the additives 40 can bleed out to a surface of the low refractive index layer 10a and can be localized at the surface thereof to form a protective layer 50. The low refractive index layer 10a may include hollow silica particles (hollow silica nanoparticles) 20a, solid core silica particles (solid core silica nanoparticles) 20b, and a binder resin 30. The hollow silica particles 20a may have an average particle diameter of greater than 20 nm and less than or equal to about 100 nm, and the solid core silica particles 20b may have an average particle diameter of about 20 nm or less. The additives 40 may include a photopolymerizable fluoropolymer and a thermopolymerizable fluoropolymer.

In an embodiment, the resin film may include greater than about 5 wt % to less than about 50 wt % of the hollow silica particles, greater than about 0 wt % to less than about 10 wt % of the solid core silica particles, and about 1.5 wt % or more to about 7 wt % or less of the photopolymerizable fluoropolymer and the thermopolymerizable fluoropolymer. A value (P2/P1) of an amount of the thermopolymerizable fluoropolymer divided by an amount of the photopolymerizable fluoropolymer may be less than about 0.43. Within this range, a resin film which has a height difference of about 10 nm to about 65 nm between a convex portion and a concave portion on an outermost surface thereof and has a difference in contact angle (ΔCA) of less than about 10° before/after a reciprocating abrasion test can be advantageously formed. In an embodiment, the resin film has a difference in contact angle (ΔCA) of about 5.4° or less, and, in one embodiment, is about 5° or less.

The resin film 10 according to an embodiment may be used as an outermost layer of an optical film, or an anti-reflection film, or may be coated onto a protective layer of a polarizer. In addition, the resin film may be suitably used in fields using films having a low index of refraction.

Another embodiment of the present invention relates to a composition for resin films, which includes: hollow silica particles 20a having an average particle diameter of greater than about 20 nm and less than or equal to about 100 nm; solid core silica particles 20b having an average particle diameter of about 20 nm or less; a photopolymerizable fluoropolymer and a thermopolymerizable fluoropolymer; and binder monomers.

The resin film and the composition for resin films according to embodiments of the present invention will be described in further detail.

Hollow Silica Particles

The hollow silica particles 20a may be dispersed within the low refractive index layer 10a. The hollow silica particles 20a have an outer layer and a hollow or porous body inside the outer layer. The outer layer and the porous body are mainly composed of silicon oxide. In addition, plural photopolymerizable functional groups described below may be coupled to the outer layer of the hollow silica particles.

The hollow silica particles 20a may be nano-scale particles (nanoparticles) having a photopolymerizable functional group. Here, the photopolymerizable functional group may be coupled to the outer layer through at least one of a Si—O—Si bond and a hydrogen bond.

In one embodiment, the hollow silica particles 20a may include at least one of an acryloyl group and a methacryloyl group, as a photopolymerizable functional group. The photopolymerizable functional group is also referred to as an ionizing radiation curable group. The hollow silica particles 20a may contain at least one photopolymerizable functional group, which is not particularly restricted in terms of the number and kind thereof. In another embodiment, the hollow silica particles 20a may contain other functional groups, for example, a thermopolymerizable functional group. Examples of the thermopolymerizable functional group may include a hydroxyl group, a silanol group, an alkoxy group, a halogen, hydrogen, an isocyanate group, and the like. Like the photopolymerizable functional group, the thermopolymerizable functional group may be coupled to the outer layer through at least one of a Si—O—Si bond and a hydrogen bond.

The average particle diameter of the hollow silica particles 20a is not particularly restricted so long as it is greater than that of the solid core silica particles 20b. For example, the hollow silica particles 20a may have an average particle diameter of greater than 20 nm and less than or equal to 100 nm, and, in one embodiment, from 40 nm to 60 nm. Within this range, it is possible to prevent or substantially prevent excessive agglomeration of the hollow silica particles 20a, while increasing uniformity, dispersibility, and transparency of the low refractive index layer 10a.

In an embodiment, the average particle diameter of the hollow silica particles 20a is an arithmetic mean value of particle diameters of the hollow silica particles 20a (particle diameters when assuming that the hollow silica particles 20a have a spherical shape). The average particle diameter of the hollow silica particles 20a may be measured using, for example, a laser diffraction/scattering particle size distribution analyzer (for example, HORIBA LA-920). However, the laser diffraction/scattering particle size distribution analyzer is not limited to a HORIBA LA-920.

Although the index of refraction of the hollow silica particles 20a may vary depending upon the index of refraction required for the low refractive index layer 10a, the index of refraction of the hollow silica particles 20a may range from 1.10 to 1.40, and, in one embodiment, from 1.15 to 1.25. The index of refraction of the hollow silica particles 20a is measured using, for example, a simulation software tool (TracePro, Lambda Research Corporation).

The hollow silica particles 20a may be present in an amount from greater than about 5 mass % to less than about 50 mass % (based on the total mass of the hollow silica particles 20a, the solid core silica particles 20b, the binder resin 30, the additives 40, and the photopolymerization initiator). Within this range, a sea-island structure having a height difference (h) of about 10 nm to about 65 nm can be advantageously formed. Further, within this range, the hollow silica particles 20a can sufficiently reduce the index of refraction of the low refractive index layer 10a, thereby improving properties of the resin film 10. In an embodiment, the hollow silica particles 20a may be present in an amount of about 6 mass % to about 49 mass %, and, in one embodiment, about 20 mass % or more to about 40 mass % or less. Within this range, the resin film can exhibit further improved properties. Further, the height difference (h) tends to increase with an increasing amount of the hollow silica particles 20a.

Solid Core Silica Particles

The solid core silica particles 20b may be dispersed within the low refractive index layer 10a. The solid core silica particles 20b may have the same features as those of the hollow silica particles 20a except that the solid core silica particles 20b have a solid core structure and have a smaller particle diameter than the hollow silica particles 20a.

The solid core silica particles 20b have a solid core structure (internal spaces are filled). The solid core silica particles 20b may have porosity (a percentage of pores to the total volume of the solid core silica particles) of substantially zero, or about 0% to about 1%.

Further, the solid core silica particles 20b may have a smaller average particle diameter than the hollow silica particles 20a. In an embodiment, the solid core silica particles 20b may have an average particle diameter of 20 nm or less. The solid core silica particles 20b may have an average particle diameter of greater than about 0 nm and less than or equal to about 20 nm, greater than 0 nm and less than or equal to about 15 nm, or from about 0.1 nm or more to about 15 nm or less. Within this range, a sea-island structure described below can be advantageously formed while preventing or substantially preventing breakage of the low refractive index layer 10a due to the size of the solid core silica particles 20b.

In an embodiment, the average particle diameter of the solid core silica particles 20b is an arithmetic mean value of particle diameters of the solid core silica particles 20b (particle diameters when assuming that the solid core silica particles 20b have a spherical shape). The particle diameter of the solid core silica particles 20b may be measured using, for example, a laser diffraction/scattering particle size distribution analyzer (for example, a HORIBA LA-920). However, the laser diffraction/scattering particle size distribution analyzer is not limited to the HORIBA LA-920.

The solid core silica particles 20b may be nano-scale particles (nanoparticles) containing a photopolymerizable functional group. Here, plural photopolymerizable functional groups may be coupled to a surface of the solid core silica particles 20b. The photopolymerizable functional group may be coupled to the surface of the solid core silica particles 20b through at least one of a Si—O—Si bond and a hydrogen bond. The photopolymerizable functional group on the surface of the solid core silica particles 20b may be defined as in the above description with respect to the photopolymerizable functional group on the surface of the hollow silica particles 20a.

In one embodiment, the solid core silica particles 20b may include at least one of an acryloyl group and a methacryloyl group, as a photopolymerizable functional group. In an embodiment, the solid core silica particles 20b may contain at least one photopolymerizable functional group, which is not particularly restricted in terms of the number and kind thereof. In another embodiment, the solid core silica particles 20b may contain other functional groups, for example, a thermopolymerizable functional group. Examples of the thermopolymerizable functional group may include a hydroxyl group, a silanol group, an alkoxy group, a halogen, hydrogen, an isocyanate group, and the like. Like the photopolymerizable functional group, the thermopolymerizable functional group may be coupled to the solid core silica particles 20b through at least one of a Si—O—Si bond and a hydrogen bond.

The solid core silica particles 20b may be present in an amount from greater than about 0 mass % to less than about 10 mass %, and, in one embodiment, from about 1 mass % to about 10 mass % (based on the total mass of the hollow silica particles 20a, the solid core silica particles 20b, the binder resin 30, the additives 40, and the photopolymerization initiator). Within this range, a sea-island structure having a height difference (h) of about 10 nm to about 65 nm can be advantageously formed while providing improved properties to the resin film 10.

The low refractive index layer 10a includes the hollow silica particles 20a and the solid core silica particles 20b as set forth above, whereby the height difference (h) between a convex portion and a concave portion can be controlled by adjusting an amount ratio of the hollow silica particles 20a to the solid core silica particles 20b. Specifically, when the amount of the solid core silica particles 20b is reduced, the sea-island structure may have an increased height difference. In addition, when the amount of the solid core silica particles 20b is increased, the sea-island structure may have a gentler gradient. As such, the low refractive index layer 10a includes the hollow silica particles 20a and the solid core silica particles 20b, whereby the sea-island structure having a height difference (h) between the convex portion and the concave portion can be formed on the surface of the low refractive index layer 10a.

The hollow silica particles 20a contained in the resin film may be coupled directly to one another. For example, the thermopolymerizable functional group and the photopolymerizable functional group of one hollow silica particle 20a may be coupled to the thermopolymerizable functional group and photopolymerizable functional group of another hollow silica particle 20a, respectively. This is because the hollow silica particles 20a are not subjected to previous network modification in manufacture of the resin film 10. Similarly, the solid core silica particles 20b may be coupled directly to one another, or the hollow silica particles 20a and the solid core silica particles 20b may be coupled directly to each other.

Binder Resin

The binder resin 30 has a mesh structure (network structure) and serves to connect the hollow silica particles 20a and the solid core silica particles 20b to one another. The binder resin 30 may include at least one polymerized binder monomer.

The binder monomer may include, for example, a hydrogen bonding group and at least two photopolymerizable functional groups. The hydrogen bonding group is a functional group capable of forming a hydrogen bond with other functional groups, and may be, for example, a hydroxyl group. The hydrogen bonding group is not limited thereto and may include other functional groups so long as the functional groups can form a hydrogen bond (i.e. the non-covalent attractive interaction between a hydrogen atom covalently bound to some other atom and an electron pair of nearby nitrogen, oxygen, sulfur, fluorine, π electron system, and the like). Examples of the photopolymerizable functional group may include at least one of an acryloyl group and a methacryloyl group.

For example, the binder monomer may include a hydroxyl group-containing polyfunctional (meth)acrylate monomer. Specifically, the hydroxyl group-containing polyfunctional (meth)acrylate monomer may include, diacrylates such as glycerine di(meth)acrylate, 2-hydroxy-3-acryloyloxypropyl (meth)acrylate, isocyanurate acrylate; tri(meth)acrylates such as pentaerythritol (meth)acrylate, pentaerythritol (meth)acrylate derivatives, penta(meth)acrylate, dipentaerythritol (meth)acrylate, and the like. It should be understood that the binder monomer is not limited thereto. In other words, the binder monomer may be any of other monomers so long as the monomer includes a hydrogen bonding group and at least two photopolymerizable functional groups.

The binder resin 30 includes a hydrogen bonding group-containing polyfunctional (meth)acrylate monomer, specifically a hydrogen bonding group-containing (meth)acrylate monomer, thereby allowing effective bleeding out of the additives 40 described below. Specifically, the binder resin 30 contains a hydrogen bonding group and thus surface tension is increased. On the other hand, the additives 40 are fluoropolymers and thus have low surface tension. Thus, the additives 40 have repellency to the binder resin 30 to effectively bleed out. In an embodiment, the binder monomer may have a surface tension of about 36 dyne/cm or more to about 45 dyne/cm or less. Within this range, the additives 40 can more effectively bleed out. In this application, the surface tension may be measured using an automatic surface tension meter DY-300, Kyowa Interface Science Co., LTD, but is not limited thereto. In an embodiment, the surface tension is measured at 25° C.

Furthermore, the binder resin 30 includes a hydrogen bonding group, whereby a sea-island structure can be more advantageously formed on the low refractive index layer 10a. Thus, the hydrogen bonding group is an important component in terms of formation of the sea-island structure on the low refractive index layer 10a.

The binder monomer includes at least three functional groups (a hydrogen bonding group and at least two photopolymerizable functional groups), whereby the binder resin 30 having a complex 3D structure (mesh structure) can be formed by mutual polymerization of these functional groups. Here, a hydrogen bonding group of one binder monomer may be thermopolymerized (polycondensed) with the thermopolymerizable functional group of the hollow silica particles 20a or a hydrogen bonding group of another binder monomer. In addition, photopolymerizable functional groups of one binder monomer may be photopolymerized with the photopolymerizable functional groups of the hollow silica particles 20a and the solid core silica particles 20b or photopolymerizable functional groups of another binder monomer. As a result, the binder resin 30 having a complex 3D structure (mesh structure) can be formed. Further, the binder monomer causes the additives 40 to bleed out, such that the remains of the additives 40 are reduced within the low refractive index layer 10a, whereby the additives 40 can be localized at the surface of the low refractive index layer 10a. Accordingly, the binder resin 30 has increased cross-linking density, thereby improving mechanical strength of the low refractive index layer 10a.

The amount of the binder resin 30 (% by mass of the binder resin 30 to the total mass of the hollow silica particles 20a, the solid core silica particles 20b, the binder resin 30, the additives 40, and the photopolymerization initiator) may be the balance excluding the amounts of the hollow silica particles 20a, the solid core silica particles 20b, the additives 40, and the photopolymerization initiator. In an embodiment, the binder resin 30 may be present in an amount of about 45 mass % to about 85 mass %, about 48 mass % to about 85 mass %, about 50 mass % to about 85 mass %, or about 50 mass % to about 80 mass %. Within this range, the binder resin can permit effective bleeding out of the additives to the surface.

Additives

The additives 40 serve to impart antifouling properties, slip properties, and scratch resistance to the low refractive index layer 10a. The additives 40 are composed of at least a photopolymerizable fluoropolymer 41. The additives 40 may further include a thermopolymerizable fluoropolymer 42.

The photopolymerizable fluoropolymer 41 contains a photopolymerizable functional group, and may be represented by Formula 1:

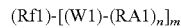   [Formula 1]

where in Formula 1, Rf1 represents a (per)fluoroalkyl group or a (per)fluoropolyether group, W1 represents a linker group, RA1 represents a polymerizable unsaturated group-containing functional group, i.e. a photopolymerizable functional group, n is an integer from 1 to 3, and m is an integer from 1 to 3.

The (per)fluoroalkyl group is not limited to a particular structure. In other words, the (per)fluoroalkyl group may have a straight-chain structure (for example, $-CF_2CF_3$, $-CH_2(CF_2)_4H$, $-CH_2(CF_2)_8CF_3$, $-CH_2CH_2(CF_2)_4H$, and the like), a branched structure (for example, $CH(CF_3)_2$, $CH_2CF(CF_3)_2$, $CH(CH_3)CF_2CF_3$, $CH(CH_3)(CF_2)_5CF_2H$, and the like), an alicyclic structure (specifically, 5-membered or 6-membered cyclic structure, more specifically, a (per)fluorocyclohexyl group, a (per)fluorocyclopentyl group, or an alkyl group substituted therewith).

The (per)fluoropolyether group is an ether bond-containing (per)fluoroalkyl group, and is not particularly limited as to structure thereof. In other words, examples of the (per) fluoropolyether group may include $-CH_2OCH_2CF_2CF_3$, $-CH_2CH_2OCH_2C_4F_8H$, $-CH_2CH_2OCH_2CH_2C_8F_{17}$, $-CH_2CH_2OCF_2CF_2OCF_2CF_2H$, a $C_4$ to $C_{20}$ fluorocycloalkyl group containing at least five fluorine atoms, and the like. In addition, other examples of the (per)fluoropolyether group may include $-(CF_2)_xO(CF_2CF_2O)_y$, $-[CF(CF_3)CF_2O]_x-[CF_2(CF_3)]$, $(CF_2CF_2CF_2O)_x$, $(CF_2CF_2O)_x$, and the like. Here, x and y are each independently a natural number.

Examples of the linker group may include a methylene group, a phenylene group, an alkylene group, an arylene group, a heteroalkylene group, and combinations thereof, without being limited thereto. These linker groups may contain a carbonyl group, a carbonyloxy group, a carbonylimino group, a sulfonamide group, and combinations thereof. Examples of the photopolymerizable functional group may include an acryloyl group and a methacryloyl group.

Since the additives 40 have lower surface tension than the binder resin 30, the additives 40 can easily bleed to the surface of the low refractive index layer. In other words, the photopolymerizable fluoropolymer and/or the thermopolymerizable fluoropolymer may have a surface tension of, for example, about 6 dyne/cm to about 20 dyne/cm. Within this range, the additives can more easily bleed to the surface of the low refractive index layer.

The photopolymerizable fluoropolymer 41 may have a lower weight average molecular weight (Mw) than the thermopolymerizable fluoropolymer 42 described below. In an embodiment, the photopolymerizable fluoropolymer 41 may have a weight average molecular weight of less than about 10,000. In addition, the photopolymerizable fluoropolymer may have a lower limit of weight average molecular weight (Mw) of, for example, about 3000 or higher. Further, although an oleic acid contact angle of the photopolymerizable fluoropolymer 41 may vary depending upon antifouling properties and slip properties for the resin film 10, the photopolymerizable fluoropolymer 41 may have an oleic acid contact angle of, for example, 10° or less. The oleic acid contact angle may be measured using, for example, a fully automatic contact angle analyzer DM700 (Kyowa Interface Science Co., LTD).

The thermopolymerizable fluoropolymer 42 is a fluoropolymer containing a thermopolymerizable functional group, and may be represented by Formula 2:

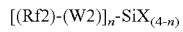  [Formula 2]

where in Formula 2, Rf2 is a (per)fluoroalkyl group or a (per)fluoropolyether group, W2 is a linker group, X is a thermopolymerizable functional group, for example, a $C_1$ to $C_4$ alkoxy group, a silanol group, a halogen, or hydrogen, and n is an integer from 1 to 3. The thermopolymerizable functional group may include the hydrogen bonding group as described above.

Structures of the (per)fluoroalkyl group, the (per)fluoropolyether group, and the linker group may be the same as the structure of the photopolymerizable fluoropolymer. The thermopolymerizable fluoropolymer may have a higher weight average molecular weight (Mw) than the photopolymerizable fluoropolymer. In an embodiment, the thermopolymerizable fluoropolymer may have a weight average molecular weight of 10,000 or more. The thermopolymerizable fluoropolymer may have an upper limit of the weight average molecular weight (Mw) of about 50,000 or less, without being limited thereto. Although the oleic acid contact angle may vary depending upon antifouling properties and slip properties for the resin film 10, the photopolymerizable fluoropolymer 41 may have an oleic acid contact angle of, for example, 10° or less.

Since both the photopolymerizable fluoropolymer 41 and the thermopolymerizable fluoropolymer 42 have a fluoropolymer part as a backbone, the fluoropolymer part and the hydrogen bonding group of the binder resin 30 can repel each other. As a result, the photopolymerizable fluoropolymer 41 and the thermopolymerizable fluoropolymer 42 can effectively bleed out. Thus, the additives 40 can bleed to the surface of the low refractive index layer 10a to be localized at the surface thereof. In addition, the protective layer 50 composed of the bleeding fluoropolymers can be formed on the surface of the low refractive index layer 10a.

The photopolymerizable fluoropolymer 41 can be coupled to the hollow silica particles 20a, the solid core silica particles 20b, and/or the photopolymerizable functional group of the binder resin 30, distributed on the surface of the low refractive index layer 10a, whereas the thermopolymerizable fluoropolymer 42 can be coupled to the hollow silica particles 20a, the solid core silica particles 20b, and/or the thermopolymerizable functional group of the binder resin 30, distributed on the surface of the low refractive index layer 10a. Here, in this embodiment the hollow silica particles 20a, the solid core silica particles 20b, and/or the binder resin 30 distributed on the surface of the low refractive index layer 10a can be protected by the localized fluoropolymers.

Conventionally, only a photopolymerizable polymer has been used as additives. Thus, in a conventional low refractive index layer, a hydroxyl group of hollow silica particles placed on the surface of the low refractive index layer is exposed. As a result, the low refractive index layer suffers from significant deterioration in antifouling properties and slip properties.

In the present embodiment, the hollow silica particles 20a and the solid core silica particles 20b placed on the surface of the low refractive index layer 10a can be protected by the photopolymerizable fluoropolymer 41 and the thermopolymerizable fluoropolymer 42. In other words, the hydroxyl groups of the hollow silica particles 20a and the solid core silica particles 20b can also be protected by the thermopolymerizable fluoropolymer 42. Thus, in the present embodiment, the surface of the low refractive index layer 10a can be uniformly or substantially uniformly protected by the photopolymerizable fluoropolymer 41 and the thermopolymerizable fluoropolymer 42, thereby improving antifouling properties and slip properties.

Further, the thermopolymerizable fluoropolymer 42 may have a higher weight average molecular weight (Mw) than the photopolymerizable fluoropolymer 41 since the photopolymerizable fluoropolymer 41 and the thermopolymerizable fluoropolymer 42 have higher surface tension with increasing weight average molecular weight (Mw) thereof, which results in effective bleeding-out and improvement in antifouling properties and slip properties.

However, when the fluoropolymer has too high a weight average molecular weight (Mw), high polarity of the acryloyl group and the methacryloyl group makes it difficult to introduce the acryloyl group and the methacryloyl group into the fluoropolymer. In other words, it is difficult to prepare the photopolymerizable fluoropolymer 41. Thus, the photopolymerizable fluoropolymer 41 and the thermopolymerizable fluoropolymer 42 have a weight average molecular weight (Mw) in the range as defined above, whereby the photopolymerizable fluoropolymer and the thermopolymerizable fluoropolymer can be advantageously dissolved in a solvent in manufacture of the resin film 10 (i.e. compatibility between the binder monomer and the additives can be enhanced).

Thus, when the photopolymerizable fluoropolymer 41 has a weight average molecular weight (Mw) of above mentioned range, the fluoropolymers, into which the acryloyl group and the methacryloyl group are introduced, can have a lower weight average molecular weight (Mw), whereby the acryloyl group and the methacryloyl group can be easily introduced into the fluoropolymers.

Further, the photopolymerizable fluoropolymer 41 serves as a compatibilizer for the thermopolymerizable fluoropolymer 42. In other words, the thermopolymerizable fluoropolymer 42 is introduced into a solvent together with the photopolymerizable fluoropolymer 41 having a low weight average molecular weight (Mw), whereby the thermopolymerizable fluoropolymer can be easily dissolved in the solvent. In the present embodiment, the thermopolymerizable fluoropolymer 42 has a high weight average molecular weight (Mw), thereby increasing the overall weight average molecular weight (Mw) of the additives 40 while reducing the weight average molecular weight (Mw) of the photopolymerizable fluoropolymer 41, whereby the additives 40 can be easily dissolved in a solvent.

The additives 40 may be present in an amount of about 1.5 mass % or more to about 7 mass % or less, and, in one embodiment, about 2.0 mass % or more to about 5.0 mass % or less (based on the total mass of the hollow silica particles 20a, the solid core silica particles 20b, the binder resin 30, the additives 40, and the photopolymerization initiator). Here, the amount of the additives 40 may be the sum of the amounts of the photopolymerizable fluoropolymer 41 and the thermopolymerizable fluoropolymer 42.

The photopolymerizable fluoropolymer 41 may be present in an amount of about 1.5 mass % or more, and, in one embodiment, about 1.8 mass % or more to about 4.0 mass % or less (based on the total mass of the hollow silica particles 20a, the solid core silica particles 20b, the binder resin 30, the additives 40, and the photopolymerization initiator). In an embodiment, the additives 40 may be essentially composed of the photopolymerizable fluoropolymer 41. Through investigation on the additives 40, the inventors have found that, when the additives 40 do not include the photopolymerizable fluoropolymer 41, a sea-island structure having a height difference of about 10 nm to about 65 nm, or about 30 nm to about 65 nm is not formed. Thus, the photopolymerizable fluoropolymer 41 is an essential component of the additives 40.

Further, the value of the amount of the thermopolymerizable fluoropolymer 42 divided by the amount of the photopolymerizable fluoropolymer 41 may be less than about 0.43, and, in one embodiment, less than about 0.25. In other words, the thermopolymerizable fluoropolymer 42 and the photopolymerizable fluoropolymer 41 may satisfy Equation 2:

$$P2/P1<0.43 \quad \text{[Equation 2]}$$

where in Equation 2, P2 is the amount of the thermopolymerizable fluoropolymer 42 and P1 is the amount of the photopolymerizable fluoropolymer 41.

In some embodiments, P2/P1 may be less than 0.43, or less than 0.25.

As described, when these conditions are satisfied, a sea-island structure having a height difference of about 10 nm to about 65 nm, or about 30 nm to about 65 nm is formed while improving properties of the resin film 10.

In addition, through investigation on the additives 40, the inventors have found that, when the additives 40 are not composed of a fluoropolymer (for example, when the additives are composed of a silicon polymer), the sea-island structure is not formed on the low refractive index layer 10a. Thus, the fact that the additives 40 are composed of the fluoropolymer is an important feature in terms of formation of the sea-island structure on the low refractive index layer 10a.

Photopolymerization Initiator

The photopolymerization initiator serves to initiate photopolymerization and is not limited to a particular kind. In the present embodiment, any photopolymerization initiator may be used. In an embodiment, a photopolymerization initiator suffering from little oxygen inhibition and having good surface curability may be used. In an embodiment, the photopolymerization initiator may include, for example, a radical polymerization initiator including at least one of azobisisobutyronitrile, potassium persulfate, tert-butylhydroperoxide, and diisopropylbenzene hydroperoxide, without being limited thereto.

The photopolymerization initiator may be present in an amount of about 0.5 mass % to about 5 mass % (based on the total mass of the hollow silica particles 20a, solid core silica particles 20b, the binder resin 30, the additives 40, and the photopolymerization initiator). In an embodiment, the photopolymerization initiator may be present in an amount of about 2 mass % to about 4 mass %. Within this range, the composition can improve properties of the resin film.

Form of Resin Film

In the present embodiment, the resin film 10 is composed of the components as described above, and the amount of each of the components is in the ranges as described above, whereby the sea-island structure is formed on the surface of the low refractive index layer 10a. Specifically, convex and concave portions 10b and 10c having different layer thicknesses are formed on the low refractive index layer 10a. The convex portion 10b has a greater layer thickness than the concave portion 10c. Here, the layer thickness of the convex portion 10b refers to a distance from a surface of the convex portion 10b (a surface on which the sea-island structure is formed) to an opposite surface (a surface adjoining a substrate coated with the resin film 10). Similarly, the layer thickness of the concave portion 10c refers to a distance from a surface of the concave portion 10c (a surface on which the sea-island structure is formed) to an opposite surface (a surface adjoining the substrate coated with the resin film 10).

For example, the convex portion 10b is an island portion, whereas the concave portion 10c is a sea portion. It should be understood that the convex portion 10b may be a sea portion, whereas the concave portion 10c may be an island portion. Thus, even when the low refractive index layer 10a is coated onto a horizontal substrate, the sea-island structure is formed on the surface of the low refractive index layer 10a. This is because the difference in layer thicknesses between the convex and concave portions 10b and 10c allows formation of the convex-concave structure, i.e. the sea-island structure, on the surface of the low refractive index layer 10a.

The height difference (h) between the convex portion 10b and the concave portion 10c, i.e. a distance from an upper end 10b' of the convex portion 10b to a lower end 10c' of the concave portion 10c, may range from 10 nm to 65 nm, and, in one embodiment, from 30 nm to 65 nm. Within this range, it is possible to prevent or substantially prevent the sea-island structure from having a steep gradient, whereby foreign materials adhered to the surface of the resin film 10 can be easily wiped off. In other words, antifouling properties can be enhanced.

Further, an angle formed between inclination at each point on the surface of the low refractive index layer 10a and a plane direction (i.e. a direction perpendicular to a thickness direction of the low refractive index layer 10a) is within a certain range (for example within ±30 degrees). Here, a positive direction is defined as a direction pointing from the plane direction toward the surface of the low refractive index layer 10a). Thus, the convex-concave structure of the low refractive index layer 10a has a gentle shape.

Further, the additives 40 are localized at the surfaces of the convex and concave portions 10b, 10c. Within the aforementioned range, when the resin film according to one embodiment of the invention is used as an anti-reflection film, the height difference (h) between the convex portion 10b and the concave portion 10c allows adjustment of a scattering rate of light, thereby improving anti-reflection ability.

The sea-island structure formed on the surface of the low refractive index layer 10a may be identified using, for example, a scanning electron microscope (SEM) or a shape measuring laser microscope. FIG. 2 is a micrograph (at 50× magnification) showing a surface of the resin film 10 according to the present embodiment, obtained using a shape measuring laser microscope. Here, in the shape measuring laser microscope, non-contact 3D measurement on an object is performed using a laser beam to obtain 3D data in the entire visual field for observation. Examples of the shape measuring laser microscope may include VK-9500 made by KEYENCE JAPAN. It should be understood that the shape measuring laser microscope is not limited thereto.

In addition, the height difference (h) may be measured using the shape measuring laser microscope. Specifically, adjacent convex and concave portions 10b, 10c are set as a unit (measuring point), and a predetermined number of units (for example, five units) may be acquired from 3D data, followed by calculating the height difference thereof. An arithmetic average of the calculated height difference is defined as a height difference (h) of the low refractive index layer 10a. Since the photopolymerizable fluoropolymer 41 and the thermopolymerizable fluoropolymer 42, that is, the additives 40, bleed to the surface of the low refractive index layer 10a, a convex-concave shape of a layer 50 composed of the additives 40 (also referred to herein as the "protective layer") is substantially measured by the shape measuring laser microscope. In other words, the height difference between convex and concave portions 51 and 52 of the protective layer 50 is measured using the shape measuring laser microscope. Here, the convex portion 51 of the protective layer 50 is formed on the convex portion 10b of the low refractive index layer 10a, and the concave portion 52 of the protective layer 50 is formed on the concave portion 10c of the low refractive index layer 10a.

Since the protective layer 50 is formed corresponding to a convex-concave shape of the low refractive index layer 10a, the convex-concave shape of the protective layer 50 is approximately the same as that of the low refractive index layer 10a. Thus, the height difference (h) of the low refractive index layer 10a may be measured using the shape measuring laser microscope.

Further, the angle formed between inclination at each point on the surface of the low refractive index layer 10a and the plane direction may also be measured using the shape measuring laser microscope. In an embodiment, the angle may be measured through the 3D data as described above.

The resin film 10 has the aforementioned structure, particularly, the sea-island structure, and thus exhibits the following characteristics.

First, since foreign materials (for example, oil, dirt, fingerprints, fabrics, sharp materials, and the like) come into contact only with the convex portion 51 of the protective layer 50, the contact area between the foreign materials and the protective layer 50 is reduced. In addition, the protective layer 50 is formed of a fluoropolymer. Thus, friction between the foreign materials and the protective layer 50 is considerably reduced. As a result, the foreign materials may be prevented or substantially prevented from adhering to the resin film 10. In addition, even when the foreign materials adhere to the resin film, the foreign materials can be easily wiped off. Further, since the foreign materials easily slip on the surface of the protective layer 50, the foreign materials may be prevented or substantially prevented from scratching the protective layer 50. Thus, the resin film 10 has improved propertied in terms of slip properties, antifouling properties, and scratch resistance. Moreover, since contact angle increases with decrease in friction, the friction can be substantially measured by measuring the contact angle.

Second, since the sea-island structure provides an increase in surface area of the low refractive index layer 10a, the amount of the bleeding additives 40 is increased. As a result, friction of the resin film 10 is reduced, thereby improving antifouling properties, slip properties, and scratch resistance of the resin film 10.

Third, an empty space is formed between foreign materials and the concave portion 52 of the protective layer 50. In other words, the foreign materials may float above the concave portion 52. In addition, air is present in this empty space and has a surface tension of zero, ideally. Thus, this also provides a reduction in friction between the foreign materials and the resin film.

Further, since the convex-concave structure of the protective layer 50 has a gentle shape, foreign materials can be easily and clearly wiped off. In other words, even though when foreign materials adhered to the convex portion 51 of the protective layer 50 are wiped off, the foreign materials may fall into the concave portion 52, fine hairs of a wiping cloth may easily get into the concave portion 52, thereby allowing the foreign materials to be easily removed from the concave portion 52.

In this regard, in the field of photoresists, for example, a film having a steep convex-concave structure, such as a moth-eye type film, is known. In the moth-eye type film, in order to increase contact angle, a convex portion stands nearly vertically with respect to a plane direction and the height difference between convex and concave portions is high (for example, several hundred nanometers). Thus, in the moth-eye type film, once foreign materials fall into the concave portion, the foreign materials may not be easily removed from the concave portion since the fine hairs of the wiping cloth are difficult to get into the concave portion.

<2. Method of Manufacturing Resin Film>

A method of manufacturing a resin film 10 according to a further embodiment of the present invention will be described. First, the method may include introducing hollow silica particles 20a having an average particle diameter of greater than about 20 nm and less than or equal to about 100 nm, solid core silica particles 20b having an average particle diameter of about 20 nm or less, a photopolymerization initiator, a binder monomer, and additives 40 into a solvent, followed by mixing, thereby preparing a coating solution. The additives 40 include a photopolymerizable fluoropolymer and a thermopolymerizable fluoropolymer. In an embodiment, the composition of the coating solution is the same as described above. Although the kind of the solvent is not particularly restricted, for example, a ketone solvent having a boiling point of about 110° C. or higher may be suitably used since this solvent can permit stable dissolution of each component while facilitating bleeding out of the photopolymerizable fluoropolymer 41 and the thermopolymerizable fluoropolymer 42. Next, the method may include applying the coating solution to a substrate and drying the coating solution to form a coating layer. Application of the coating solution may be performed by any suitable method known in the art without limitation. Here, the photopolymerizable fluoropolymer 41 and the thermopolymerizable fluoropolymer 42 bleed out due to repulsion by the binder monomer and are localized at a surface of the coating layer. As a result, the protective layer 50 can be formed by the photopolymerizable fluoropolymer and the thermopolymerizable fluoropolymer having bled to the surface of the coating layer. Next, each polymerization is initiated. As a result, the binder resin 30 is formed while the photopolymerizable fluoropolymer 41 and the thermopolymerizable fluoropolymer 42 are coupled to the hollow silica particles 20a, the solid core silica particles 20b, and the binder resin 30 disposed on the surface of the coating layer. As a result, the resin film 10 is formed.

Since the binder monomer allows effective bleeding out of the photopolymerizable fluoropolymer 41 and the thermopolymerizable fluoropolymer 42, the resin film 10 according the present embodiment can be prepared through a very simple process. In addition, since the additives 40 are localized at the surface of the low refractive index layer 10a, there is no need for a separate antifouling sheet to be attached to the surface of the low refractive index layer 10a.

In one embodiment, the resin film 10 may have a thickness of about 60 nm to about 150 nm. Within this range, the resin film 10 may be advantageously used as an antireflection film.

The resin film 10 prepared as described above may be used as, for example, an anti-reflection film. In a polarizing plate including a polarizer, a first optical film disposed on an upper side of the polarizer, and a second optical film disposed on a lower side of the polarizer, the resin film may be coated onto an upper side of the first optical film, i.e. an uppermost portion of the polarizing plate to serve as an anti-reflection film. In this case, a substrate to which the coating solution is applied may be the first optical film, whereas the second optical film may be a protective film or a retardation film. In an embodiment, the substrate may be a transparent film, which may include polyester films including polyethyleneterephthalate (PET), cyclic polyolefin (COP) films, cellulose films including triacetylcellulose (TAC), acrylic films, polycarbonate films, polyethersulfone films, polysulfone films, polyamide films, polyimide films, polyarylate films, and polyvinyl alcohol films, without being limited thereto.

In one embodiment, the resin film may be coated onto the upper side of the polarizer excluding the first optical film.

EXAMPLES

Example 1

Herein, some examples of embodiments will be further described. In Example 1, the resin film 10 was prepared as follows.

50 mass % (parts by mass) of pentaerythritol triacrylate (A-TMM-3LMN, Shin Nakamura Kagaku Co.) as a binder monomer, 40 mass % of hollow silica particles (Surulia 4320, Nikki Shokubai Kasei Co.), 5 mass % of solid core silica particles (V8802, Nikki Shokubai Kasei Co.), 1.8 mass % of photopolymerizable perfluoropolyether (PFPE) (KY-1203, Shinetsu Kagaku Kogyo Co., Ltd.) and 0.2 mass % of thermopolymerizable perfluoropolyether (PFPE) (KY-108, Shinetsu Kagaku Kogyo Co., Ltd.) as additives, and 3 mass % of a photopolymerization initiator (Irgacure 184, BASF Japan Ltd.) were prepared. Then, these components were added to 8,000 mass % of methylisobutylketone (MIBK) and mixed therewith, thereby preparing a coating solution.

Here, the hollow silica particles had particle diameters ranging from 50 nm to 60 nm. Thus, the hollow silica particles had an average particle diameter in the above range. In addition, the hollow silica particles had an index of refraction of 1.25. The solid core silica particles had particle diameters greater than 0 nm and less than or equal to 15 nm. Thus, the hollow solid particles had an average particle diameter in the above range. In addition, the solid core silica particles had a porosity of nearly 0% and the hollow silica particles had a porosity of about 22%. The porosity was measured using transmission electron microscopy (TEM). Specifically, a hollow portion and a solid portion were specified based on an image captured using TEM, followed by calculation of the volume of the particles and the volume of the hollow portion based on the specified results. Then, the porosity was roughly calculated by the volumes and by the equation of Porosity=(volume of hollow portion/total volume of particle)×100. In addition, the pentaerythritol triacrylate had a surface tension of 39.8. The photopolymerizable PFPE had a weight average molecular weight (Mw) of 8,000 and a surface tension of 16.7. The thermopolymerizable PFPE had a weight average molecular weight (Mw) of 17,000 and a surface tension of 16.5. Here, measurement was performed using the aforementioned device or simulation software tool.

Thereafter, the coating solution was applied to a PMMA substrate, followed by drying at 90° C. for 1 minute, thereby forming a coating layer. Then, the coating layer was cured through UV irradiation (metal halide lamp, at 1,000 mJ/cm$^2$) for 5 seconds under a nitrogen atmosphere (oxygen content: 1,000 ppm or less), thereby preparing a resin film. The resin film had an average thickness of 110 nm. Measurement of film thickness was performed using a visible light spectroscopic ellipsometer SMART SE of HORIBA Co. Ltd., and the average thickness was an arithmetic mean of the maximum and minimum values of the measured values.

Examples 2 to 16 and Comparative Examples 1 to 7

Resin films according to Examples 2 to 16 and Comparative Examples 1 to 7 were prepared in the same manner as in Example 1 except that the amount of each component and the average particle diameter of the solid core silica particles were changed.

The amount of each component and the average particle diameter of the solid core silica particles are shown in Table 1.

TABLE 1

| (mass %) | Hollow particle | Solid particle | Photopolymerization initiator | Binder (acrylic resin) | Additive: Photopolymerizable PFPE (P1) | Additive: thermopolymerizable PFPE (P2) | Ratio of additives (P2/P1) | Total number of additives |
|---|---|---|---|---|---|---|---|---|
| Example 1 | 40 | 5 | 3 | 50 | 1.8 | 0.2 | 0.11 | 2 |
| Example 2 | 30 | 5 | 3 | 60 | 1.8 | 0.2 | 0.11 | 2 |

TABLE 1-continued

| (mass %) | Hollow particle | Solid particle | Photopolymerization initiator | Binder (acrylic resin) | Additive: Photopolymerizable PFPE (P1) | Additive: thermopolymerizable PFPE (P2) | Ratio of additives (P2/P1) | Total number of additives |
|---|---|---|---|---|---|---|---|---|
| Example 3 | 20 | 5 | 3 | 70 | 1.8 | 0.2 | 0.11 | 2 |
| Example 4 | 10 | 5 | 3 | 80 | 1.8 | 0.2 | 0.11 | 2 |
| Example 5 | 45 | 5 | 3 | 45 | 1.8 | 0.2 | 0.11 | 2 |
| Example 6 | 40 | 5 | 3 | 50 | 1.5 | 0.5 | 0.33 | 2 |
| Example 7 | 40 | 5 | 3 | 47 | 4 | 1 | 0.25 | 5 |
| Example 8 | 40 | 3 | 3 | 47 | 6 | 1 | 0.17 | 7 |
| Example 9 | 40 | 1 | 3 | 54 | 1.8 | 0.2 | 0.11 | 2 |
| Example 10 | 40 | 3 | 3 | 52 | 1.8 | 0.2 | 0.11 | 2 |
| Example 11 | 40 | 5 | 3 | 50 | 1.8 | 0.2 | 0.11 | 2 |
| Example 12 | 40 | 10 | 3 | 45 | 1.8 | 0.2 | 0.11 | 2 |
| Example 13 | 10 | 1 | 3 | 84 | 1.8 | 0.2 | 0.11 | 2 |
| Example 14 | 10 | 3 | 3 | 82 | 1.8 | 0.2 | 0.11 | 2 |
| Example 15 | 10 | 5 | 3 | 80 | 1.8 | 0.2 | 0.11 | 2 |
| Example 16 | 10 | 10 | 3 | 75 | 1.8 | 0.2 | 0.11 | 2 |
| Comp. Example 1 | 40 | 0 | 3 | 55 | 1.8 | 0.2 | 0.11 | 2 |
| Comp. Example 2 | 5 | 3 | 3 | 87 | 1.8 | 0.2 | 0.11 | 2 |
| Comp. Example 3 | 0 | 3 | 3 | 92 | 1.8 | 0.2 | 0.11 | 2 |
| Comp. Example 4 | 50 | 3 | 3 | 42 | 1.8 | 0.2 | 0.11 | 2 |
| Comp. Example 5 | 40 | 5 ※1 | 3 | 50 | 1.8 | 0.2 | 0.11 | 2 |
| Comp. Example 6 | 40 | 5 ※2 | 3 | 50 | 1.8 | 0.2 | 0.11 | 2 |
| Comp. Example 7 | 40 | 5 | 3 | 50 | 2.0 | 0 | — | 2 |

※1 represents the use of solid core silica particles having an average particle diameter of 40 nm (Organosilicasol L-type, Nissan Kagaku Kogyo, Co., Ltd.)
※2 represents the use of solid core silica particles having an average particle diameter of 80 nm (Organosilicasol ZL-type, Nissan Kagaku Kogyo, Co., Ltd.).

(Experiment)

Next, for the resin film of each of the Examples and Comparative Examples, the following experiment was performed.

(Reciprocating Abrasion Test with Eraser)

A substrate coated with the resin film was subjected to a 500-cycle reciprocating abrasion test using an eraser on the coated surface thereof under a load of 500 g/cm$^2$ in a vertical direction (up/down direction). As the eraser, an eraser MONOPE-04A available from Tombow Pencil Co. was used.

(Evaluation)

Each of the resin films was evaluated as to the following properties.

(Evaluation as to Presence of Sea-Island Structure)

The presence of the sea-island structure on an initial resin film (before the reciprocating abrasion test using the eraser) was determined using the aforementioned shape measuring laser microscope. In this evaluation, a height difference (h) was measured at five points. Here, when the height difference (h) was 20 nm or higher, it was determined that the sea-island structure was formed thereon.

(Evaluation of Height Difference)

For the resin film having been identified as having the sea-island structure, the height difference (h) (upper end 10b' of a convex portion–lower end 10c' of a concave portion) was measured using the aforementioned shape measuring laser microscope. In addition, the height difference (h) was measured at five points.

(Evaluation of Gradient)

An angle defined between inclination of each point on the surface of the resin film and a plane direction was measured using the aforementioned shape measuring laser microscope. As a visual field for observation, an area was selected from the surface of the resin film, followed by obtaining 3D data in the entire visual field for observation. Then, the angle defined between inclination of each point on the surface of the resin film and a plane direction was measured based on the 3D data.

(Evaluation of Contact Angle CA, Unit: °)

An initial contact angle CA2 was measured using a fully automatic contact angle analyzer (DM700, Kyowa Interface Science Co., LTD.) after dropping 2 μl of pure water onto a substrate coated with the resin film. Thereafter, a contact angle CA1 after the reciprocating abrasion test was measured after a 500-cycle reciprocating abrasion test using an eraser on the coated surface thereof under a load of 500 g/cm$^2$. Then, a difference in contact angle (ΔCA) was calculated by substituting the obtained CA1 and CA2 values into Equation 1:

$$\Delta CA = |CA2 - CA1| \quad \text{[Equation 1]}$$

(Evaluation of Marker Wiping)

A line of about 3 cm was drawn on the surface of the substrate coated with the resin film using a marker pen and left for 1 minute. Then, the line was wiped off using a wipe while making a circular motion. As the black marker pen, Mackee made by ZEBRA Co. Ltd., was used, and as the wipe, Kimwipe wiper S-200 made by NIPPON PAPER CRECIA Co. Ltd., was used. Thereafter, the presence of marks was checked with the naked eye. A result of no marks left is denoted by [O], and a result of marks left is denoted by [X].

(Evaluation of Fingerprint Adhesion and Wiping)

A fingertip was pressed tightly against the surface of the substrate coated with the resin film under a load of about 200 g to imprint a fingerprint. Thereafter, the fingerprint was wiped off 20 times using a wipe while making a circular motion. As a wipe, Kimwipe wiper S-200 made by NIPPON PAPER CRECIA Co. Ltd., was used. Thereafter, the presence of fingerprint marks was checked with the naked eye. A result of no fingerprint marks left is denoted by [O], and a result of Fingerprint marks left is denoted by [X].

Results are shown in Table 2.

TABLE 2

|  | Presence of sea-island structure | Height Difference (nm) | CA2 | CA1 | ΔCA (CA2 − CA1) | Marker wiping | Fingerprint wiping |
|---|---|---|---|---|---|---|---|
| Example 1 | Yes | 51 | 111.5 | 107.1 | 4.4 | O | O |
| Example 2 | Yes | 57 | 111.2 | 107.3 | 3.9 | O | O |
| Example 3 | Yes | 43 | 111.1 | 107.5 | 3.6 | O | O |
| Example 4 | Yes | 41 | 111 | 105.9 | 5.1 | O | O |
| Example 5 | Yes | 56 | 110.9 | 106.3 | 4.6 | O | O |
| Example 6 | Yes | 34 | 111.3 | 105.9 | 5.4 | O | O |
| Example 7 | Yes | 64 | 112.3 | 107.8 | 4.5 | O | O |
| Example 8 | Yes | 61 | 110.6 | 106.5 | 4.1 | O | O |
| Example 9 | Yes | 45 | 111.7 | 109.8 | 1.9 | O | O |
| Example 10 | Yes | 32 | 111.8 | 110 | 1.8 | O | O |
| Example 11 | Yes | 25 | 111.7 | 110 | 1.7 | O | O |
| Example 12 | Yes | 11 | 111.2 | 108.6 | 2.6 | O | O |
| Example 13 | Yes | 28 | 111 | 109.1 | 1.9 | O | O |
| Example 14 | Yes | 21 | 111 | 109 | 2 | O | O |
| Example 15 | Yes | 15 | 110.9 | 108.1 | 2.8 | O | O |
| Example 16 | Yes | 12 | 110.1 | 107.3 | 2.8 | O | O |
| Comp. Example 1 | Yes | 53 | 111.6 | 100.9 | 10.7 | X | X |
| Comp. Example 2 | No | — | 110.6 | 99.3 | 11.3 | X | X |
| Comp. Example 3 | No | — | 111.2 | 98.9 | 12.3 | X | X |
| Comp. Example 4 | No | — | 110.6 | 83.5 | 27.1 | X | X |
| Comp. Example 5 | Yes | 51 | 110.2 | 100.1 | 10.1 | X | X |
| Comp. Example 6 | Yes | 58 | 111.1 | 100.9 | 10.2 | X | X |
| Comp. Example 7 | No | — | 107.9 | 85.6 | 22.3 | X | X |

It was ascertained that the resin films of Examples 1 to 16 had a gentle convex-concave structure. In other words, the angle was ±30 degrees or less in the entire visual field for observation using the shape measuring microscope.

In comparison of Examples and Comparative Examples, in Comparative Examples it could be seen that the resin films did not have a sea-island structure from the beginning, excluding some Comparative Examples. And in Examples, the resin films had good initial properties while exhibiting excellent properties after the reciprocating abrasion test. On the other hand, in Comparative Examples, although the resin films had good initial contact angle properties, the resin films exhibited poor properties after the reciprocating abrasion test. Thus, it could be seen that, when at least a photopolymerizable fluoropolymer was used as additives, the binder resin was formed using a binder monomer having repellency to the photopolymerizable fluoropolymer, and the amount of each component was in the range as described above, the resin film exhibited good properties. Further, in the Examples it was seen that the height difference of the sea-island structure could be controlled by adjusting the amount ratio of the hollow silica particles to the solid core silica particles.

As described above, according to embodiments of the present invention, the resin film 10 includes the additives 40 coupled to the hollow and solid core silica particles 20a, 20b distributed on a surface of the low refractive index layer 10a and exhibiting repellency to the binder resin 30. Thus, the additives 40 effectively bleed out due to repulsion by the binder resin 30, whereby the additives 40 can be localized at the surface of the low refractive index layer 10a in the resin film 10. As a result, the resin film 10 exhibits improved properties in terms of antifouling properties, slip properties, scratch resistance, and film strength.

In embodiments of the present invention, the sea-island structure is formed on the surface of the low refractive index layer 10a, whereby friction between the surface of the resin film 10 and foreign materials can be reduced, thereby providing improvement in antifouling properties, slip properties, and scratch resistance of the resin film 10. In addition, the height difference of the sea-island structure can be controlled by adjusting the amount ratio of the hollow silica particles 20a to the solid core silica particles 20b.

In embodiments of the present invention, the amount of each component is in the range as described above, whereby convex and concave portions having a height difference of about 10 nm to about 65 nm can be formed on the low refractive index layer 10a.

In embodiments of the present invention, the binder resin 30 contains a hydrogen bonding group to allow effective bleeding out of the additives 40.

Further, the binder resin 30 contains a hydroxy group as a hydrogen bonding group, thereby allowing effective bleeding out of the additives 40.

The thermopolymerizable fluoropolymer 42 has a higher weight average molecular weight than the photopolymerizable fluoropolymer 41. Thus, the additives 40 can effectively bleed out. In addition, the photopolymerizable fluoropolymer 41 functions as a compatibilizer, thereby improving solubility of the additives 40 in a solvent.

In an embodiment, the thermopolymerizable fluoropolymer 42 has a weight average molecular weight of about 10,000 or more, and the photopolymerizable fluoropolymer 41 has a weight average molecular weight of less than about 10,000, whereby the additives 40 can effectively bleed out. In addition, the photopolymerizable fluoropolymer 41 functions as a compatibilizer, thereby improving solubility of the additives 40 in a solvent.

The resin film 10 may be easily prepared by applying and polymerizing the coating solution in which each component has been dissolved.

Although some embodiments have been described above, it will be apparent to those skilled in the art that these embodiments are given by way of illustration only, and that various modifications, changes, alterations, and equivalent embodiments can be made without departing from the spirit and scope of the invention.

LIST OF REFERENCE NUMERALS

10: Resin film
10a: Low refractive index layer
10b: Convex portion of low refractive index layer
10c: Concave portion of low refractive index layer
20a: Hollow silica particles
20b: Solid core silica particles
30: Binder resin
40: Additive
41: Photopolymerizable fluoropolymer
42: Thermopolymerizable fluoropolymer
50: Protective layer
51: Convex portion of protective layer
52: Concave portion of protective layer

The invention claimed is:

1. A resin film comprising hollow silica particles having a porosity of about 10% or more and solid core silica particles having a porosity of about 5% or less, an average particle diameter of the hollow silica particles being greater than an average particle diameter of the solid core silica particles, the resin film having a height difference of about 10 nm to about 65 nm between a convex portion and a concave portion on an outermost surface thereof, and having a difference in contact angle (ΔCA) of less than about 10°, as represented by Equation 1:

ΔCA=|CA2-CA1|  [Equation 1]

where in Equation 1, CA1 is a water droplet contact angle after a surface of a substrate coated with the resin film has been subjected to a 500-cycle reciprocating abrasion test using an eraser under a load of 500 g/cm$^2$, and CA2 is a water droplet contact angle before the reciprocating abrasion test, wherein the resin film further comprises a protective layer at an outer surface of the resin film, the protective layer comprising a photopolymerizable fluoropolymer represented by Formula 1 as follows:

(Rf1)-[(W1)-(RA1)$_n$]$_m$, where, in Formula 1, Rf1 represents a (per)fluoroalkyl group or a (per)fluoropolyether group, W1 represents a linker group, RA1 represents a polymerizable unsaturated group-containing functional group, n is an integer from 1 to 3, and m is an integer from 1 to 3.

2. The resin film according to claim 1, wherein the average particle diameter of the hollow silica particles is greater than about 20 nm and less than or equal to about 100 nm, and the average particle diameter of the solid core silica particles is about 20 nm or less.

3. The resin film according to claim 2, wherein the hollow silica particles are present in an amount from greater than about 5 wt % to less than about 50 wt %, and the solid core silica particles are present in an amount from greater than about 0 wt % to less than about 10 wt %.

4. The resin film according to claim 1, wherein the protective layer further comprises a thermopolymerizable fluoropolymer represented by Formula 2 as follows:

[(Rf2)-(W2)]$_n$-SiX$_{(4-n)}$, where, in Formula 2, Rf2 is a (per)fluoroalkyl group or a (per)fluoropolyether group, W2 is a linker group, X is a thermopolymerizable functional group, and n is an integer from 1 to 3.

5. The resin film according to claim 4, wherein the total amount of the photopolymerizable fluoropolymer and the thermopolymerizable fluoropolymer is from about 1.5 mass % or more to about 7 mass % or less.

6. A resin film having a height difference of about 10 nm to about 65 nm between a convex portion and a concave portion on an outermost surface thereof, and having a difference in contact angle (ΔCA) of less than about 10°, as represented by Equation 1:

ΔCA=|CA2-CA1|  [Equation 1]

where in Equation 1, CA1 is a water droplet contact angle after a surface of a substrate coated with the resin film has been subjected to a 500-cycle reciprocating abrasion test using an eraser under a load of 500 g/cm$^2$, and CA2 is a water droplet contact angle before the reciprocating abrasion test, wherein the resin film comprises a thermopolymerizable fluoropolymer and a photopolymerizable fluoropolymer satisfying Equation 2:

P2/P1<0.43  [Equation 2]

where in Equation 2, P2 is an amount of the thermopolymerizable fluoropolymer and P1 is an amount of the photopolymerizable fluoropolymer.

* * * * *